United States Patent Office 3,810,929
Patented May 14, 1974

3,810,929
POLYCARBOXYLIC ACID-BRIDGED THIO-
METHYLENEPHENOL ANTIOXIDANTS
John Song, Bound Brook, N.J., assignor to American
Cyanamid Company, Stamford, Conn.
No Drawing. Continuation-in-part of abandoned application Ser. No. 5,089, Jan. 22, 1970. This application Aug. 24, 1972, Ser. No. 283,601
Int. Cl. C07g 1/00
U.S. Cl. 260—455 R    7 Claims

ABSTRACT OF THE DISCLOSURE

Thiomethylenephenol compounds are provided wherein from two to four hindered phenol radicals having thiomethyl substituents meta to their hydroxy groups are joined, either directly or through interposed ethoxy groups, to the carbonyl radicals of an organic polycarboxylic acid. These compounds have the formula:

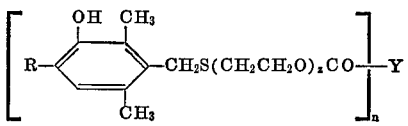

wherein R is a branched chain alkyl group containing three to about twelve carbon atoms, $z$ is zero or one, $n$ is 2, 3, or 4, and Y is the residue of the organic carboxylic acid $Y(COOH)_n$. They are antioxidants for oxygen-sensitive organic materials, particularly polyolefins of 2–6 carbon atoms such as polypropylene plastics. They are prepared by condensing from 2 to 4 moles of a 3-mercaptomethyl-2,4-dimethyl-6-branched-chain alkylphenol with the chloride or bromide of an organic dicarboxylic, tricarboxylic or tetracarboxylic acid, preferably in the presence of an acid acceptor, or by first condensing the corresponding 3-chloromethylphenol with 2-mercaptoethanol and esterifying the resulting condensate with the polycarboxylic acid halide.

---

This application is a continuation-in-part of application No. 5,089, filed Jan. 22, 1970, now abandoned.

This invention relates to thiomethylenephenol compounds wherein two or more hindered phenol radicals are joined through thiomethyl groups to the carbonyl radicals of organic polycarboxylic acids, either directly or through interposed ethoxy groups. I have found that compounds of this class which have the chemical structures hereinafter defined can be prepared from readily available starting materials, and that they are good antioxidants for organic materials subject to oxidative deterioration when added thereto in antioxidizing amounts. My invention therefore includes the new compounds themselves, their methods of preparation, compositions of matter in which they are incorporated as antioxidants, and antioxidant processes in which they are used.

The new polycarboxylic acid-bridged thiomethylenephenols of my invention are defined accurately by the formula (I)
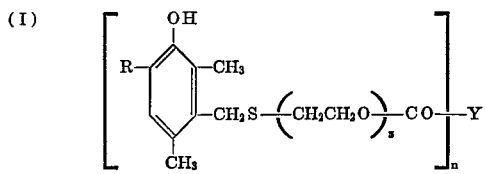

in which R is a branched-chain alkyl of 3 to 12 carbon atoms, $z$ is zero or 1, $n$ is a whole number from 2 to 4, and Y is the residue of the organic carboxylic acid $Y(COOH)_n$.

In all of these compounds the thiomethylene-containing radical is meta to the hydroxyl group and is therefore not in conjugation therewith; this imparts good antioxidant and non-staining properties to the compounds. In addition the phenolic hydroxyl is fully hindered by a methyl radical adjacent the thiomethylene substituent and by a larger secondary or tertiary alkyl of at least three and preferably four or more carbon atoms on its opposite side. This ensures the formation of antioxidants that are non-discoloring, a very important property in an antioxidant for polyolefins and other light-colored synthetic and natural plastics. Representative branched-chain alkyls that may be present at the 6-position of the phenol radical are isopropyl, isobutyl, tertiary butyl, dimethylpropyl, tertiary octyl, 2,2-diethylhexyl, and di- and tri-propylene and butylene radicals. Tertiary butyl is the preferred substituent.

The preferred compounds of my invention are those according to Formula I in which $n$ is 2 and Y is a straight-chain or branched-chain alkylene or thioalkylene of 2 to about 12 carbon atoms or a mononuclear arylene radical of the formula (II)
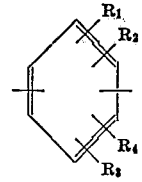

in which $R_1$, $R_2$, $R_3$, and $R_4$ are hydrogen or lower alkyl radicals, preferably of from 1 to about 2 carbon atoms. Representative polycarboxylic acids which contain these radicals, and which may be used in the form of their halides to prepare compounds of Formula I, are succinic acid, glutaric acid, pimelic acid, dimethylglutaric acid, adipic acid, oxalic acid, malonic acid, suberic acid, azeleic acid, diphenic acid, maleic acid, fumaric acid, itaconic acid, sebacic acid, o-phthalic acid, isophthalic acid, terephthalic acid and alkyl-substituted phthalic acids such as methylterephthalic acid, and 2,5-dimethyl-terephthalic acid, hexahydrophthalic acid, p-phenylenediacetic acid, and the like. The thioldicarboxylic acids of the formula $HOOC.(CH_2)_n\text{—}S\text{—}(CH_2)_n.COOH$ wherein $n$ is a whole number from 1 to 4 such as thiolpropionic acid are particularly important in preparing antioxidants for polypropylene and other synthetic and natural rubbers.

In addition to these preferred classes, halides of aromatic polycarboxylic acids such as trimesic acid, trimellitic acid, pyromellitic, tricarballylic acid, aconitic acid, hemimellitic acid, naphthalene tetracarboxylic acid, etc., are useful.

The most readily available starting materials for preparing the phenolic moieties of my new compounds are the corresponding 2,4-dimethyl-6-secondary or tertiary alkylphenols. Halomethyl substituents such as the chloromethyl group can be introduced into the 3-position of these phenols by reaction with hydrochloric acid and formaldehyde or methylal in the presence of hydrochloric acid and $H_2SO_4$ by the procedure of R. Wegler and E. Regel, reported in Makromol. Chem. 9, 1 (1952). The 3-chloromethyl-2,4-dimethyl-6-sec. or tert. alkylphenols, prepared by this procedure, may then be reacted with 2-mercaptoethanol or they may be converted into the corresponding 3-mercaptomethyl-2,4-dimethyl-6-sec. or tert. alkylphenols by dissolving the chloromethyl compound in tetrahydrofuran, adding at least a molecular equivalent of an acid acceptor such as triethylamine, trimethylamine or anhydrous potassium carbonate and bubbling in hydrogen sulfide until the mercaptan formation is complete.

Reaction between the 3-chloromethyl-2,4-dimethyl-6-alkylphenol and 2-mercaptoethanol is preferably carried out in a mutual solvent such as methyl isobutyl ketone, acetone or the like using a base such as anhydrous potassium carbonate as acceptor for the hydrochloric acid evolved. The reaction is most advantageously carried out under reflux, after which the mixture is cooled, acidified with hydrochloric acid, and the organic layer is separated and washed with water. The solvent is then removed by vacuum distillation, leaving the 2,6-dimethyl-3-hydroxy-6-alkyl-benzylthioethanol as an oily residue. From two to four moles of this material is used to esterify one mole of an organic dicarboxylic, tricarboxylic or tetra-carboxylic acid, which is preferably reacted in the form of its chloride or other acid halide by the procedures described and illustrated in the following examples.

The compounds of my invention in which two or more thiomethylenephenol groups are linked directly to the carbonyl radicals of an organic polycarboxylic acid are prepared by reacting the appropriate molar proportions of a 3-mercaptomethyl-2,4-dimethyl-6-sec. or tert. alkylphenol with the acid halide, preferably the chloride or bromide, of the organic acid in the presence of an acid acceptor such as pyridine or one of the other basic materials previously described. The reaction is preferably carried out in a solvent such as tetrahydrofuran and at relatively low temperatures on the order of 25°–50° C., and the product is recovered by acidifying the reaction mixture and extracting with a volatile solvent such as benzene. The product may be further purified by chromatography on silica or alumina gel, using a chloroform-ethyl acetate eluant.

It will thus be seen that my new process for the preparation of the compounds of Formula I has as its essential feature the reaction of one mole of an organic polycarboxylic acid halide, preferably the chloride or bromide, with a stoichiometrically equivalent quantity (i.e. two, three or four moles, equal to the number of carbonyl groups in the polycarboxylic acid) of a compound of the formula:

(III)

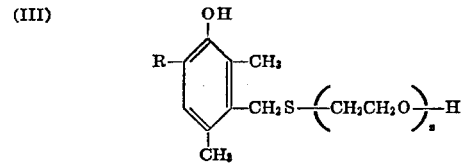

in which R is a branched-chain alkyl of 3 to 12 carbon atoms and z is zero or one. This reaction is preferably carried out in the presence of an acid acceptor capable of combining with the hydrochloric acid evolved and in a non-aqueous solvent such as chloroform, tetrahydrofuran and the like, and is continued until a polycarboxylic acid-bridged thiomethylenephenol is obtained. The preferred process is one wherein the chloride of an aliphatic dicarboxylic acid or thiolbisaliphatic carboxylic acid of from 4 to about 14 carbon atoms or a mononuclear aromatic dicarboxylic acid of from 8 to about 16 carbon atoms is used.

The compounds of this invention are especially useful as antioxidants for polyolefins (e.g., homopolymers or copolymers of mono α-olefins of 2–6 carbons) in which they exhibit a high degree of activity and are non-discoloring. The compounds can be similarly used in other organic material normally subject to oxidative deterioration, including ABS resins (acrylonitrile-butadiene-styrene copolymers), the polyamides, polyacetals (e.g., polyformaldehyde), polystyrene, impact polystyrene, natural rubber and the various synthetic rubbers including ethylene-propylene copolymer rubbers, and in oils, fats, greases, gasoline and the like.

The compounds are incorporated into the various substrates according to any of the well known techniques, including milling, Banbury mixing, swelling, etc. In polypropylene the compounds are effectively incorporated by milling on a conventional two roll plastic mill. The compounds are effective as antioxidants over a range of concentration of from about 0.01 to about 5%. In polypropylene they are used preferably at a concentration of from 0.05 to 1%, based on the weight of the substrate. These quantities are sometimes hereinafter described as antioxidizing amounts of the antioxidant compound or compound mixture.

In the case of polymers, after milling, during which other ingredients such as filler, plasticizers and light absorbers may be added, the polymer composition is compression molded, cast, spun, injection molded or extruded to a shaped article.

The antioxidant activity of the compounds of this invention in polypropylene is greatly enhanced by concurrent use with esters of thiodipropionic acid, well known secondary stabilizers for polypropylene.

Oxidative deterioration of polypropylene and other similar oxidizable plastic materials is evident from the embrittlement which occurs on exposure to atmospheric oxygen. The extent to which the antioxidant protects against deterioration is measured by determining the hours to embrittlement at 140° C.–150° C. when a specimen 15–20 mils in thickness containing the antioxidant, is exposed in a forced draft oven at this temperature.

The invention will be further described and illustrated by the following specific examples to which, however, it is not limited except as is indicated by the appended claims.

EXAMPLE 1

Bis[2-(4-t-butyl-3-hydroxy-2,6-dimethylbenzylthio)-ethyl] terephthalate

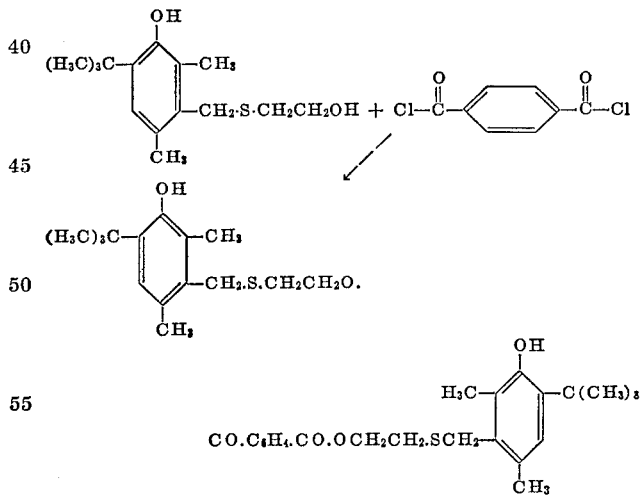

To a 2 liter 3-neck flask, equipped with a Dean-Stark Trap, containing 900 ml. of methyl isobutyl ketone was added 189 g. (0.83 mole) of 6-tert-butyl-3-chloromethyl-2,4-dimethylphenol, 65 g. (0.83 mole) of 2-mercaptoethanol, 115 g. (0.83 mole) of anhydrous potassium carbonate and 2 g. (.012 mole) of potassium iodide. The stirred mixture was heated to reflux until the azeotropic distillation ceased. The mixture was cooled to 50° and added to 750 ml. of 0.61 N hydrochloric acid. The organic layer was separated and washed with four 200 ml. portions of water. The solvent was removed by distillation in-vacuo to give 217 g. (97%) of an oil residue.

A solution of 15.82 g. (.20 mole) of terephthaloyl chloride in 30 ml. of chloroform was slowly added to a stirred mixture of 33.4 g. (.125 mole) of the 6-tert-butyl-3-[(2-hydroxyethylthio)methyl]-2,4-dimethylphenol, prepared as described above, and 15.82 g. (.20 mole) of pyridine in 130 ml. of chloroform. The reaction was heated at 35–40° for a period of 17½ hours and cooled. The chloroform solution was washed with four 50 ml. portions of water, dried over anhydrous sodium sulfate and concentrated in-vacuo to give 44 g. of a tacky residue.

Successive recrystallizations from methanol and chloroform, respectively, gave an analytical specimen, colorless crystals, M.P. 142–145°.

Calc. C=68.47, H=7.51, S=9.61. Found: C=68.47, H=6.62, S=9.58.

EXAMPLE 2

Bis [4-t-butyl-3-hydroxy-2,6-dimethylbenzyl)-thio] ethyl adipate

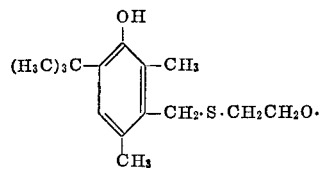

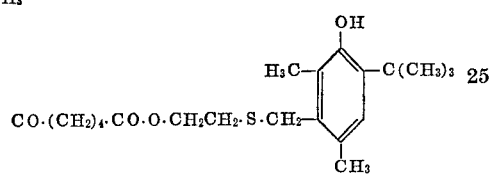

To a mixture containing 26.8 g. (0.10 mole) of 6-tert-butyl - 3 - [(2 - hydroxyethylthio) methyl]-2,4-dimethylphenol, prepared as in Example 1, and 7.91 g. (0.10 mole) of pyridine in 100 ml. of tetrahydrofuran was added a solution containing 8.25 g. (.045 mole) of adipoyl chloride in 45 ml. of tetrahydrofuran. The mixture was allowed to react at 30–35° for a period of 18 hrs. The pyridine hydrochloride (9.35 g.: theory 10.4 g.) was removed by filtration and the filtrate concentrated to 50 ml. This was added to 200 ml. of cold water to give an oily precipitate which was taken up in 200 ml. of benzene. The benzene solution was washed with 15% brine solution, dried over anhydrous sodium hydroxide to give 27.0 g. of an oil. The product was purified by successive chromatography on silica gel using CHCl₃-ethyl acetate (1:1), benzene-ethylacetate (1:2), benzene, respectively. A further chromatography on alumina using hexane-ethylacetate (2:1) gave a specimen whose nmr results confirmed the assigned structure for the desired compound.

EXAMPLE 3

Bis [4-t-butyl-3-hydroxy-2,6-dimethylbenzyl)-thio] ethyl succinate

The procedure of Example 2 was repeated but 6.97 g. (0.45 mol) of succinyl chloride was substituted for the adipoyl chloride. The product was purified by chromatography and was obtained as a viscous oil.

EXAMPLE 4

Tetrakis [2-(4-t.-butyl-3-hydroxy-2,6-dimethylbenzylthio)ethyl]pyromellitate

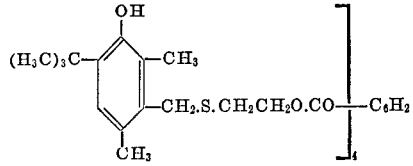

To a mixture of 27 g. (0.10 mole) of 6-tert-butyl-3-[(2 - hydroxy - ethylthio)methyl]-2,4-dimethylphenol, 12.6 g. (.16 mole) of pyridine in 130 ml. of tetrahydrofuran was added a solution containing 6.6 g. (.02 mole) of pyromellitoyl chloride in 100 ml. of tetrahydrofuran. The reaction was stirred at a temperature of 30–35° over a period of 12 hours and acidified with hydrochloric acid.

Evaporation of the solvent gave an oily residue which was taken up with 300 ml. of benzene. The benzene solution was washed with water, dried over anhydous sodium sulfate, and concentrated to give 37 g. of an oily residue. This was purified by chromatography on alumina using hexane-ethyl acetate (1:2) mixture to give a yellow oil. The structure of this product was supported by N.M.R. Spectroscopy.

EXAMPLE 5

Bis [2-(4-tert-butyl-3-hydroxy-2,6-dimethylbenzylthio) ethyl]-2,5-dimethylterephthalate

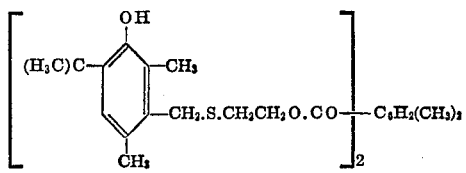

Following the procedure of Example 4 but substituting the appropriate quantity of 2,5-dimethylterephthaloyl chloride for the pyromellitoyl chloride, the above compound is produced.

EXAMPLE 6

Bis (4-t-butyl-3-hydroxy-2,6-dimethylbenzyl)-dithiol adipate

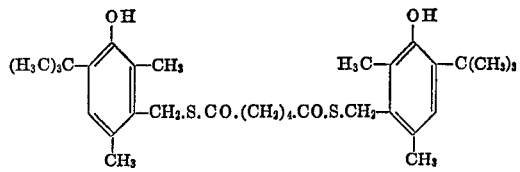

To a 500 ml. 3-necked flask was added 26.88 g. (0.12 mole) of 3-hydroxy-2,6-dimethyl-4-tert.butylbenzylmercaptan, and 11.86 g. (0.15 mole) of pyridine in 115 ml. of tetrahydrofuran. A solution of 9.15 g. (0.05 mole) of adipoyl chloride in 25 ml. of tetrahydrofuran was slowly added to the mixture with stirring, which was continued at about 25–35° C. for 22 hours.

A 4.2 ml. portion of concentrated hydrochloric acid was diluted with 200 ml. of water and added to the reaction mixture, which was then extracted with two 100 ml. portions of benzene. The benzene extracts were combined, washed twice with water, and concentrated to a syrupy residue. The product, after purification by chromatography on silica gel using a chloroform-ethyl acetate mixture, was obtained as colorless crystals.

EXAMPLE 7

Bis (4-t-butyl-3-hydroxy-2,6-dimethylbenzyl)-3,3'-thiobis (thioldipropionate)

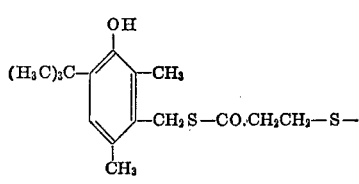

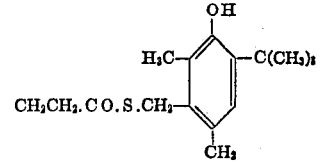

To a 500 ml. 3-necked flask was added 26.88 g. (0.12 mole) of 3-hydroxy-2,6-dimethyl-4-tert-butylbenzylcaptan, 11.86 g. (0.15 mole) of pyridine in 115 ml. of tetrahydrofuran. A solution of 10.75 g. (.05 mole) of 3,3'-thiodipropionylchloride in 20 ml. of tetrahydrofuran was slowly added to the mixture with stirring. The reaction was allowed to stir at a temperature of 30–5° over a period of 21 hours.

A 4.2 ml. portion of conc. hydrochloric acid was added to the reaction concentrated and diluted by addition of 200 ml. of cold water. The aqueous solution was extracted with two 100 ml. pertions of benzene. The benzene solution was washed with two 100 ml. portions of water and concentrated to give 38 g. of a syrupy residue.

The product was purified by chromatography on silica gel using a chloroform-ethyl acetate (4:1) mixture, and followed by a successive chromatography on silica gel using benzene as the eluant. Recrystallization from benzene gave an analytical specimen, colorless crystals, M.P. 124–5°.

Calc'd: C=65.08; H=7.80; S=16.27. Found: C=65.27; H=8.13; S=16.22.

EXAMPLE 8

Bis(4-tert-butyl-3-hydroxy-2,6-dimethylbenzyl) dithiolterephthalate

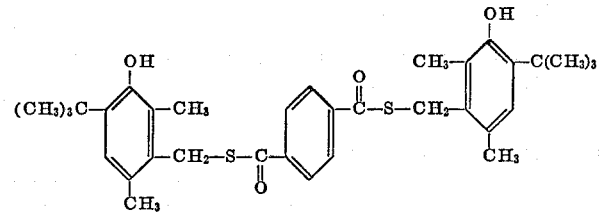

A solution of 8.12 g. (.04 mole) of terephthaloyl chloride in 40 ml. of benzene was slowly added to a stirred mixture consisting of 22.4 g. (0.10 mole) of 6-tert-butyl-3-hydroxy-2,6-dimethylbenzyl mercaptan, 39.6 g. (0.50 mole) of pyridine and 45 ml. of benzene. The reaction was allowed to proceed for 12 hours at a temperature of 39–42°.

The reaction mixture was added to 250 ml. of ice water containing 35 ml. (0.42 mole) of conc. hydrochloric acid to form a yellow oily precipitate. This was extracted with a 250 ml. portion of benzene. The benzene solution was washed with two 100 ml. portions of water, dried over anhydrous sodium sulfate, and concentrated to give 25 g. of crystallizate.

The crude product was recrystallized from a hexane-benzene-acetonitrile (11:6:1) mixture to give 12.98 g. of cream colored crystals, M.P. 208–212°. An additional recrystallization from benzene-hexane (1:2) mixture gave an analytical specimen, M.P. 215–218°.

Calc: C=70.59, H=7.27, S=11.07. Found: C=70.14, H=7.24, S=10.75.

EXAMPLE 9

Bis[3-hydroxy-4-tert.butyl-2,6-dimethylbenzyl] dithiolisophthalate

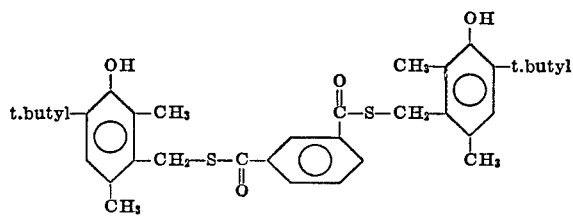

To a solution of isophthaloyl chloride (5.07 grams, 0.025 mole) in 25 ml. of pyridine was added a solution of 3 - hydroxy-4-tert.-butyl-2,6-dimethylbenzyl mercaptan (11.2 grams, 0.05 mole) in 35 ml. benzene containing 10 ml. pyridine. The mixture was refluxed for one hour, cooled and poured into water. The mixture was then acidified with concentrated hydrochloric acid, extracted with benzene and the combined benzene extracts washed with water and dried. Removal of benzene gave 13 grams of crystals which were recrystallized from methylcyclohexane to give 8.25 grams of a white solid, M.P. 206–208° C.

EXAMPLE 10

Bis[3-hydroxy-4-(1,1,3,3-tetramethylbutyl)-2,6-dimethylbenzyl]dithiolterephthalate

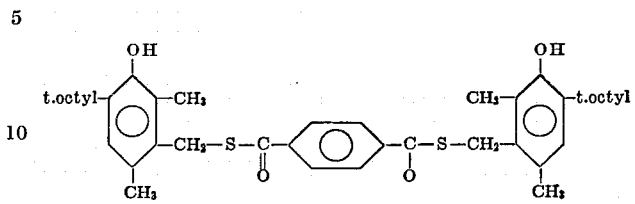

To a mixture of 3-hydroxy-4-(1,1,3,3-tetramethylbutyl) 2,6-dimethylbenzyl mercaptan (26 grams, 0.092 mole) and terephthaloyl chloride (8.12 grams, 0.04 mole) in 150 ml. of benzene was added pyridine (39.6 grams 0.50 mole) in 50 ml. of benzene. The temperature was maintained at 40° C. for 12 hours, the reaction mixture added to 35 ml. of concentrated hydrochloric acid in 200 grams of ice, and the aqueous layer discarded.

The benzene layer was washed with three 100 ml. portions of water, concentrated and the residue (31 grams) dissolved in 75 ml. of a mixture of methanol-hexane-chloroform (8:6:1). Seeding of the solution afforded 11 grams of pale yellow crystals. Recrystallization from 55 ml. of benzene-hexane (1:4.5) gave 7.5 grams of pale yellow crystals, M.P. 83–88°.

EXAMPLE 11

Representative compounds of the present invention were incorporated into unstabilized polypropylene in amounts of 0.2% on the weight of the polymer by milling at 175–180° C. The polypropylene was then compression molded into films 15–20 mils in thickness. These were aged in a forced-draft oven at 140° C. and the efficiency of the compound as an antioxidant was determined by noting the time in hours to embrittlement at this temperature. The results are shown in the following table.

TABLE I

| Compound of: | Hours of brittle point |
|---|---|
| Example 1 | 540–550 |
| Example 2 | 390–410 |
| Example 4 | 130–140 |
| Example 7 | 970–990 |
| Example 8 | 2020–2040 |
| Example 9 | 1767–1775 |
| Example 10 | 1563–1603 |

I claim:
1. A compound of the formula:

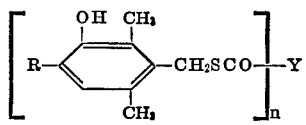

wherein R is a branched chain alkyl group containing three to about 12 carbon atoms, n is 2, 3, or 4, and Y is an alkylene or thioalkylene of 2 to about 12 carbon atoms or a mononuclear aromatic hydrocarbon radical of the formula

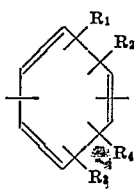

wherein $R_1$, $R_2$, $R_3$, and $R_4$ are hydrogen or lower alkyl radicals.

2. A compound as defined in claim 1 wherein R is t-butyl.

3. A compound as defined in claim 1 wherein Y is selected from the group consisting of

—CH$_2$CH$_2$SCH$_2$CH$_2$— m-phenylene, and p-phenylene and $n$ is 2.

4. A compound as defined in claim 3 which is bis(4-t-butyl-3-hydroxy-2,6-dimethylbenzyl)dithiolterephthalate.

5. A compound as defined in claim 3 which is bis(3-hydroxy-4-t-butyl-2,6-dimethylbenzyl)dithiolisophthalate.

6. A compound as defined in claim 3 which is bis(3-hydroxy-4-t-octyl-2,6-dimethylbenzyl)dithiolterephthalate.

7. A compound as defined in claim 3 which is bis(4-t-butyl - 3-hydroxy-2,6-dimethylbenzyl)-3,3'-thiobis(thioldipropionate).

References Cited

UNITED STATES PATENTS

| 3,260,756 | 7/1966 | O'Shea et al. | 260—455 A |
|---|---|---|---|
| 3,260,736 | 7/1966 | Martin et al. | 20—455 A |
| 3,422,059 | 1/1969 | Taylor et al. | 260—473 S |
| 3,553,158 | 1/1971 | Gilfillan | 260—45.85 R |
| 3,459,704 | 8/1969 | Brooks et al. | 260—45.85 R |

FOREIGN PATENTS 426,332   3/1967   Japan   260—455 A

LEWIS GOTTS, Primary Examiner

D. R. PHILLIPS, Assistant Examiner

U.S. Cl. X.R.

260—45.85, 45.95, 475 A, 485 J; 252—406